July 14, 1964 E. S. LEE III 3,141,159
DIGITAL MAGNETIC CODE CONVERTER
Filed March 7, 1960
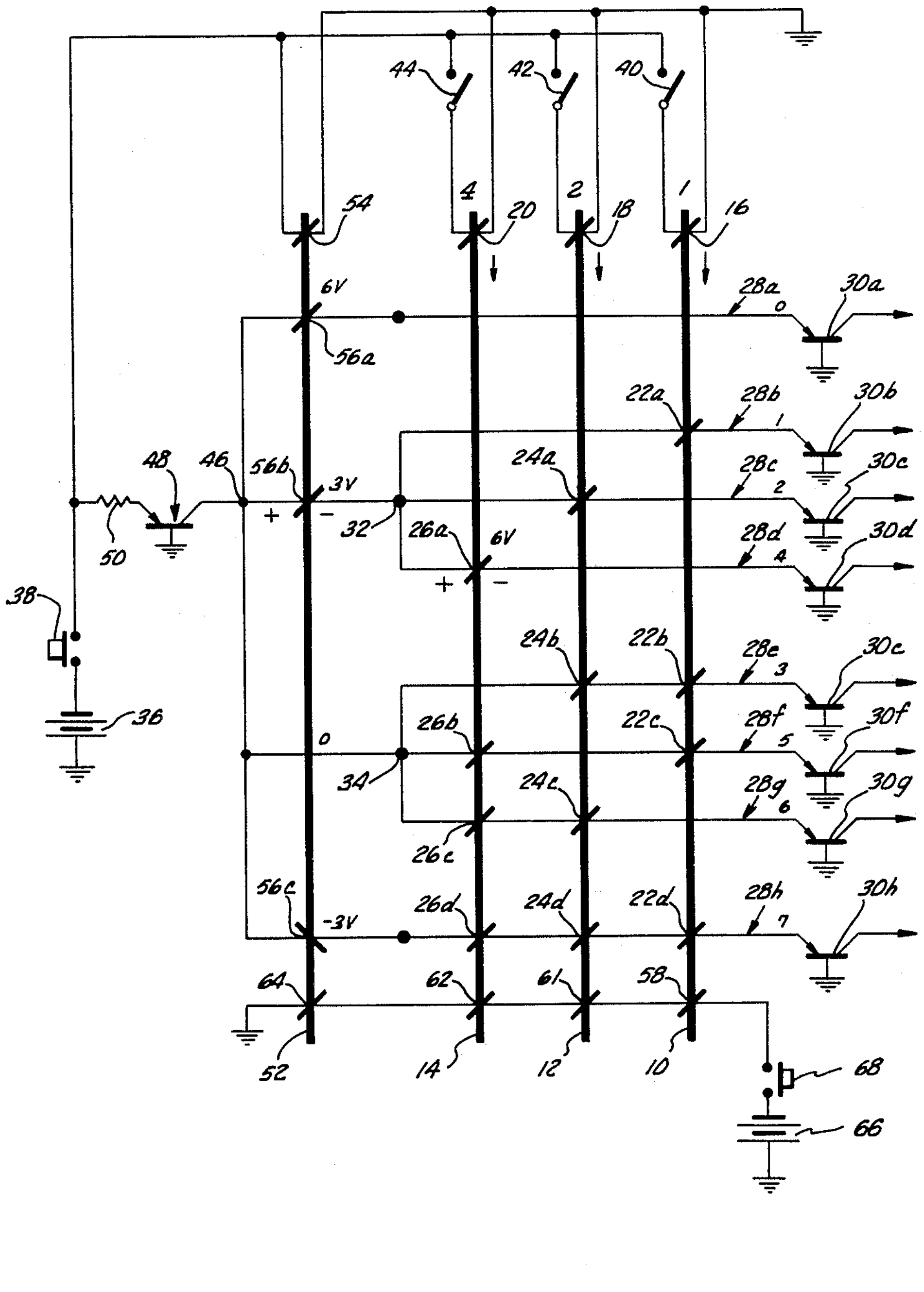
INVENTOR.
EDWIN S. LEE, III
BY
Christie, Parker & Hale
ATTORNEYS.

United States Patent Office 3,141,159
Patented July 14, 1964

3,141,159
DIGITAL MAGNETIC CODE CONVERTER
Edwin S. Lee III, San Gabriel, Calif., assignor to Burroughs Corporation, Detroit, Mich., a corporation of Michigan
Filed Mar. 7, 1960, Ser. No. 13,292
9 Claims. (Cl. 340—347)

This invention relates to digital code converters and, more particularly, is concerned with a magnetic core matrix circuit for converting a binary code to a one-out-of-K code.

The use of matrix circuits is well known for converting from one code to another. For example, matrix circuits have been heretofore proposed which may be used to convert between a binary code and a decimal code. With the advent of the magnetic core random access memory, matrix decoders were developed for converting address information in the form of a binary coded word to select one or a group of a large number of readout lines in the magnetic core memory circuit. Such magnetic decoders are known in the art as memory access switches. Various memory access switches using magnetic cores have heretofore been proposed, but all of these magnetic core matrix switches have required a number of cores at least equal to the number of output lines, i.e., the value of K in the one-out-of-K output code.

In copending application Serial No. 13,194 filed March 7, 1960, in the name of Robert Minnick and Edwin Lee and assigned to the same assignee as the present invention, there is decribed an improved magnetic core matrix switch which requires only as many cores as there are input binary bits. The present invention is a modification of the circuit therein described. The present invention likewise provides a magnetic core matrix switch which requires only as many cores as there are input binary bits, although additional cores may be used for providing bias voltages. The modification of the present invention has the advantage that it utilizes a simplified input and control circuit in which unidirectional pulses are employed. It also results in half the number of output windings on each core.

In brief, the present invention provides a match circuit for converting a binary coded input of N binary bits to a one-out-of-K code, where $K=2^N$. The matrix circuit comprises a plurality of magnetic core elements equal in number to the number of binary bits N, with an input winding and a plurality of output windings wound on each core element. The input to the matrix circuit is provided by simultaneously pulsing selected ones of the input windings with a single unipolar pulse. The output windings are arranged in a plurality of series output circuits equal in number to the number of outputs K. Each output circuit includes an output transistor having a grounded base electrode and a number of output windings connected in series with the emitter electrode of the associated transistor. The output circuits are arranged in groups with all the output circuits in any one group having the same number of series connected output windings and a common drive terminal, the number of series connected windings in the output circuit of any one group being different from the number of series connected output windings in any other group. Bias voltage means connects each of the groups to the collector electrode of an input transistor. A current pulse applied to the emitter electrode of the input transistor simultaneously with the pulsing of the selected input windings results in current being steered through one and only one of the output circuits.

For a more complete understanding of the invention, reference should be had to the accompanying drawing, wherein the single figure is a schematic wiring diagram of a matrix circuit incorporating the features of the present invention.

Referring to the drawing in detail, a matrix circuit according to the present invention is shown which is arranged to convert a three bit binary code to a one-out-of-8 code. However, it is to be understood that the principles of the invention can be extended to a larger number of input bits with a correspondingly increased number of outputs. The "mirror" scheme of notation has been used in the drawing to simplify the figure. Each magnetic core is represented by a heavy vertical line, three information cores being indicated respectively at 10, 12 and 14. Flux may be considered as extending either upwardly or downwardly along the length of the cores, as indicated by the arrows. Each of the three information cores in the embodiment shown in the figure is provided with a single input winding, indicated at 16, 18 and 20, respectively. A winding on the core is represented by a line crossing the core with a diagonal line through the intersection, the polarity of the winding being indicated by the direction of the diagonal line. The polarity of the winding is determined from the figure by considering the diagonal line as the edge of a mirror. A beam of light directed at the mirror in the direction of current flow in the winding is reflected by the mirror in the direction of the flux produced in the core by the current. If current flows away from ground in the input winding 16, it will be apparent from the convention used that flux is induced in the core 10 in a downwardly direction in the figure.

Each of the magnetic cores is provided with a plurality of output windings, as indicated at 22*a–d*, 24*a–d* and 26*a–d*, respectively. The rule for determining the polarity of an induced voltage in an output winding, according to the mirror convention, is that any resulting current flow must be in the direction which opposes flux change in the core. The mirror notation for core windings is well known and is described, for example, in the book Digital Computer Components and Circuits, by R. K. Richards, D. Van Nostrand Co., Inc., 1957, page 196.

A maximum of $2^N$ output circuits are provided, where N is the number of input binary bits. Thus, in the example shown in the figure, eight output circuits are provided, as indicated at 28*a–h*. Each of the output circuits includes a grounded base transistor, as indicated at 30*a–h*. The output circuits are arranged in groups with the output circuits in any one group having the same number of series connected output windings connecting a common terminal to the respective emitter electrodes of the associated transistors. Thus the first output circuit 28*a* has zero number of output windings connected in series and is the only output circuit so arranged. In the next group, each output circuit has one output winding connected in series between a common terminal 32 and each of the respective transistor emitter electrodes. In the example shown in the figure, since there are three information cores, there are three output circuits in the group, each output circuit having a single output winding associated with a respective one of the three cores.

The next group has two output windings connected in series in each output circuit between a common terminal 34 and the respective transistor emitter electrode. In the example shown in the figure, there are three output circuits in this group, each of which has two series output windings. The last output circuit 28*h* has three output windings in series.

In general, it can be said that there are N+1 groups of output circuits, the number of output circuits in a group being expressed by the combination equation $$\frac{N(N-1)(N-2)\ldots(N-R+1)}{R!}$$

where $R$=the number of series output windings in each output circuit of the group and may have any value from zero to N.

It should be noted that all of the output windings are connected with the same polarity and that all the input windings are connected with the same polarity so that the induced voltages in the output windings add in the same direction in all the series output circuits in response to pulsing of the various input windings of the several cores.

The matrix circuit is arranged to steer current through one of the output circuits, depending upon the flux switching pattern in the cores produced by pulsing of the input windings. To this end, the input windings 16, 18 and 20 are connected in parallel to a pulse source, represented in the figure by a battery 36 and a push button switch 38. The input windings are connected through switches 40, 42 and 44, respectively, by means of which any combination of input windings on the cores may be selected according to a binary code. While manual switches have been shown for simplicity, it will be recognized that conventional electronic digital techniques may be used for controlling the selection of the respective windings in response to binary input information.

The groups of output circuits are all connected to a common terminal 46 which in turn is preferably connected to the collector electrode of a grounded base transistor 48. A current pulse is applied to the emitter electrode of the transistor 48. The current pulse may be derived from the battery 36 by the momentary closing of the push button 38 through a current limiting resistor 50. Thus the current pulse is applied to the output circuits simultaneously with the pulsing of the input windings of the core matrix.

Current pulses are steered through only one of the output circuits by an arrangement in which all but one of the output transistors has its emitter circuit back-biased. This is accomplished by inserting different bias voltages in series with each of the different groups of output circuits. While various means may be provided for inserting a series bias voltage, the preferred arrangement comprises a bias magnetic core 52 having an input winding 54 and a plurality of output windings 56*a–c*. the input winding 54 is connected to the pulse source formed by the battery 36 and push button 38 so that flux is switched in the bias core 52 simultaneously with switching of flux in the selected information cores. The respective output windings are connected in series between the common terminal 46 and the several groups of output windings.

As the number of series windings in the output circuits of an associated group increases, the series bias voltage must decrease, assuming the bias voltage has the same polarity as the voltage induced across the output windings of the information cores. However, the sum of the bias voltage plus the maximum voltage induced across one of the associated output circuits must increase as the number of series windings in the associated output circuits increases.

In other words, the voltage induced across the output winding 56*a* of the bias core 52 must be greater than the voltage induced across the output winding 56*b*. This can be readily accomplished by modifying the number of turns in the output winding. Since no output winding is connected in series with the common terminal 34, no bias voltage is provided. Zero bias voltage is obviously smaller than the bias voltage produced by the output winding 56*b*. The winding 56*c* has its polarity reversed so that, in effect, it produces a negative bias voltage, the negative bias voltage being smaller than no bias voltage.

By making the incremental steps of bias voltage between bias core output windings smaller than the voltage induced across one of the output windings on the information cores, the second condition is satisfied, namely, that the maximum voltage induced across the bias winding plus the associated group of output circuits increases as the number of series output windings in the output circuits of a group increases.

A reset winding is provided for initially setting the residual flux in each of the information cores and the bias core to increase the available flux. For this purpose, a resetting current is pulsed through resetting windings 58, 60, 62 and 64 wound respectively on the cores 10, 12, 14 and 52. The pulse source includes a battery 66 and reset push button switch 68.

Operation of the circuit involves first resetting the cores by actuating switch 68. Then, with selected ones of the binary input switches 40, 42 and 44 set, the switch 38 is actuated to produce an output. With the residual flux in all the cores reset, closing of switch 38 results in one and only one of the output transistors being forward-biased in response to the selected combination of switching on the input windings of the information cores.

The operation of the circuit shown in the figure may be best understood by assuming that each output winding on the information cores has, for example, six volts induced across the winding when the flux is switched in the associated core. Further, it may be assumed that the output windings on the driving core produce voltages which differ by three volts. Thus the winding 56*a* has six volts induced across it, the winding 56*b* has three volts induced across it, and the winding 56*c* has minus three volts induced across it. It should be further kept in mind that the emitter electrodes of the output transistors, when forward-biased, cannot have a potential much above ground since the transistors would saturate.

Under these conditions, the maximum potential rise from the common terminal 46 to the emitter electrode of the first output transistor 30*a* is six volts, namely, the voltage induced across the winding 56*a*. The maximum potential rise from the common terminal 46 to the emitter electrodes of the three transistors 30*b–d*, forming the second group of output circuits, is nine volts while the minimum potential rise is three volts. The maximum voltage from the common terminal 46 to the emitter electrodes of the transistors 30*e–g* is twelve volts, and the minimum potential rise is zero volts. The maximum voltage rise from the common terminal 46 to the emitter electrode of the transistor 30*h* is fifteen volts and the minimum is minus three volts.

It will accordingly be appreciated that if none of the information cores are switched, a maximum potential rise occurs in the output circuit connecting the common terminal 46 to the emitter of the first transistor 30*a*, and only the transistor 30*a* is forward-biased. Accordingly, the current pulse produced by the momentary closing of the switch 38 results in an output on the collector electrode of the output transistor 30*a*. On the other hand, if one and only one of the cores is switched, the maximum potential rise occurs on one of the output windings associated with the first group of output circuits. For example, if flux is switched in the core 10, then the maximum potential rise occurs from the common terminal 46 to the emitter of the output transistor 30*b*. Since the emitter is effectively clamped to ground, all the other emitters must be negative with respect to ground and so are back-biased. By the same token, if two cores are switched, then the maximum potential rise will occur on the emitter electrode of one of the output transistors 30*e–g*, and if all three cores are switched in response to a particular input pattern, the maximum potential rise will occur on the emitter electrode of the output transistor 30*h*. Accordingly, depending on the binary input pattern as determined by the setting of the switches 40–44, only one of the output transistors is forward-biased while all the other transistors are back-biased. A current pulse transmitted through the input transistor 48 is conveyed to one of a plurality of output circuits by means of a forward-biased transistor.

From the above description, it will be recognized that a matrix converter is provided in which the number of cores is determined by the number of input bits. The circuit has the advantage that the number of output windings on each core is only half the number of available output circuits. The circuit arrangement also has the advantage that the core elements are preset by a resetting pulse. A single unipolar pulse simultaneously applied to selected input windings of the cores actuates the converter.

What is claimed is:

1. A matrix circuit for converting a binary coded input of N binary bits to a one-out-of-K code, where $K=2^N$, the matrix circuit comprising a plurality of magnetic core elements equal in number to the number of input binary bits N, an input winding on each core element, means for setting the residual flux in the same direction in all the core elements, means responsive to the binary input for simultaneously pulsing selected input windings to reverse the direction of the residual flux in the selected cores, a plurality of output windings on each core element, a plurality of output circuits equal in number to the number of outputs K, each output circuit including an output transistor having a grounded base electrode and a number of output windings connected in series with the emitter electrode of the associated transistor, the number of series output windings in each output circuit being any number from zero to N, the output circuits being arranged in $N+1$ groups with the output circuits in any one group having the same number of series connected output windings and a common terminal, the number of series connected output windings in the output circuits in any one group being different from the number of series connected output windings in any other group, an input transistor having a grounded base electrode, and a plurality of bias voltage sources respectively connecting each of the common terminals to the collector electrode of the input transistor, the bias voltage associated with each group of output circuits decreasing in magnitude as the number of series windings in the output circuits of the associated group increases, the decrease in voltage from one bias voltage means to the next being less than the voltage induced across any one of the output windings by the pulsing of the input windings.

2. Apparatus as defined in claim 1 wherein the bias voltage sources include a magnetic core element having an input winding and a plurality of output windings, there being one output winding for each group of output circuits, the output windings being connected to form the respective bias voltage sources.

3. A matrix circuit for converting a binary coded input of N binary bits to a one-out-of-K code, where $K=2^N$, the matrix circuit comprising a plurality of magnetic core elements equal in number to the number of input binary bits N, an input winding on each core element, means for setting the residual flux in the same direction in all the core elements, means responsive to the binary input for simultaneously pulsing selected input windings to reverse the direction of the residual flux in the selected cores, a plurality of output windings on each core element, a plurality of output circuits, each output circuit including an output transistor having a grounded base electrode and a number of output windings connected in series with the emitter electrode of the associated transistor, the number of series output windings in each output circuit being any number from zero to N, the output circuits being arranged in groups with the output circuits in any one group having the same number of series connected output windings and a common terminal, the number of series connected output windings in the output circuits in any one group being different from the number of series connected output windings in any other group, an input transistor having a grounded base electrode, and a plurality of bias voltage sources respectively connecting each of the common terminals to the collector electrode of the input transistor, the bias voltage associated with each group of output circuits decreasing in magnitude as the number of series windings in the output circuits of the associated group increases, the decrease in voltage from one bias voltage means to the next being less than the voltage induced across any one of the output windings by the pulsing of the input windings.

4. A matrix circuit for converting a binary coded input of N binary bits to a one-out-of-K code, where $K=2^N$, the matrix circuit comprising a plurality of magnetic core elements equal in number to the number of input binary bits N, an input winding on each core element, means for setting the residual flux in the same direction in all the core elements, means responsive to the binary input for simultaneously pulsing selected input windings to reverse the direction of the residual flux in the selected cores, a plurality of output windings on each core element, a plurality of output circuits, each output circuit including an output transistor having a grounded base electrode and a number of output windings connected in series with the emitter electrode of the associated transistor, the number of series output windings in each output circuit being any number from zero to N, the output circuits being arranged in groups with the output circuits in any one group having the same number of series connected output windings and a common terminal, the number of series connected output windings in the output circuits in any one group being different from the number of series connected output windings in any other group, an input transistor having a grounded base electrode, and a plurality of bias voltage sources respectively connecting each of the common terminals to the collector electrode of the input transistor.

5. A matrix circuit for converting a binary coded input of N binary bits to a one-out-of-K code, where $K=2^N$, the matrix circuit comprising a plurality of magnetic core elements equal in number to the number of input binary bits N, an input winding on each core element, a plurality of output windings on each core element, a plurality of output circuits, each output circuit including an output transistor having a grounded base electrode and a number of output windings connected in series with the emitter electrode of the associated transistor, the number of series output windings in each output circuit being any number from zero to N, the output circuits being arranged in groups with the output circuits in any one group having the same number of series connected output windings and a common terminal, the number of series connected output windings in the output circuits in any one group being different from the number of series connected output windings in any other group, an input transistor having a grounded base electrode, and a plurality of bias voltage sources respectively connecting each of the common terminals to the collector electrode of the input transistor.

6. A matrix circuit for converting a binary coded input of N binary bits to a one-out-of-K code, where $K=2^N$, the matrix circuit comprising a plurality of magnetic core elements equal in number to the number of input binary bits N, an input winding on each core element, means for setting the residual flux in the same direction in all the core elements, means responsive to the binary input for simultaneously pulsing selected input windings to reverse the direction of the residual flux in the selected cores, a plurality of output windings on each core element, a plurality of output circuits equal in number to the number outputs K, each output circuit including a unidirectional conductive device and a number of output windings connected in series, the number of series output windings in each output circuit being any number from zero to N, the output circuits being arranged in N+1 groups with the output circuits in any one group having the same number of series connected output windings and a common terminal, the number of series connected output windings in the output circuits in any one group being different from the number of series connected output windings in any other group, a current pulse source, and a plurality of bias voltage sources respectively connecting each of the common terminals to one side of the current pulse source, the return to the current pulse source being connected to all output circuits at the opposite ends of the output circuits from said common terminals, the bias voltage associated with each group of output circuits decreasing in magnitude as the number of series windings in the output circuits of the associated group increases, the decrease in voltage from one bias voltage means to the next being less than the voltage induced across any one of the output windings by the pulsing of the input windings.

7. Apparatus as defined in claim 6 wherein the bias voltage sources include a magnetic core element having an input winding and a plurality of output windings, there being one output winding for each group of output circuits, the output windings being connected to form the respective bias voltage sources.

8. A matrix circuit for converting a binary coded input of N binary bits to a one-out-of-K code, where $K=2^N$, the matrix circuit comprising a plurality of magnetic core elements equal in number to the number of input binary bits N, an input winding on each core element, a plurality of output windings on each core element, a plurality of output circuits, each output circuit including a unidirectional conductive device and a number of output windings connected in series, the number of series output windings in each output circuit being any number from zero to N, the output circuits being arranged in groups with the output circuits in any one group having the same number of series connected output windings and a common terminal, the number of series connected output windings in the output circuits in any one group being different from the number of series connected output windings in any other group, a current pulse source, and a plurality of bias voltage sources respectively connecting each of the common terminals to one side of the current pulse source, the return to the current pulse source being connected to all output circuits at the opposite ends of the output circuits from said common terminals.

9. A matrix circuit comprising a plurality of core elements, an input winding and a plurality of output windings wound on each core element, a plurality of output series circuits, each circuit including a unidirectional conductive element for clamping one end of the series circuit to a predetermined potential when the element is conducting current in its low impedance direction, the series output circuits being arranged in groups in which a plurality of series output circuits are connected in parallel, each of the series output circuits of a particular group including a predetermined number of series connected output windings from as many different core elements, the number of series connected output windings being different for each group, means for adding a separate bias voltage in series with each of said groups, the bias voltage being different for each group and determined by the number of series connected windings associated with each group, the groups of output circuits and series bias means being connected in a parallel network, and means for pulsing the parallel network simultaneously with the pulsing of selected input windings on the core elements.

References Cited in the file of this patent

UNITED STATES PATENTS

| | | |
|---|---|---|
| 2,846,671 | Yetter | Aug. 5, 1958 |
| 2,905,934 | Flint | Sept. 22, 1959 |

UNITED STATES PATENT OFFICE

CERTIFICATE OF CORRECTION

Patent No. 3,141,159 July 14, 1964

Edwin S. Lee III

It is hereby certified that error appears in the above numbered patent requiring correction and that the said Letters Patent should read as corrected below.

Column 1, line 43, for "match" read -- matrix --.

Signed and sealed this 24th day of November 1964.

(SEAL)
Attest:

ERNEST W. SWIDER
Attesting Officer

EDWARD J. BRENNER
Commissioner of Patents